United States Patent
Noles

(10) Patent No.: US 8,095,459 B2
(45) Date of Patent: *Jan. 10, 2012

(54) METHOD AND SYSTEM FOR PROVIDING FLEXIBLE FINANCING

(75) Inventor: Michael K. Noles, West Chester, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 58 days.

This patent is subject to a terminal disclaimer.

(21) Appl. No.: 12/686,498

(22) Filed: Jan. 13, 2010

(65) Prior Publication Data

US 2010/0114779 A1 May 6, 2010

Related U.S. Application Data

(63) Continuation of application No. 10/436,462, filed on May 13, 2003, now Pat. No. 7,676,425.

(60) Provisional application No. 60/398,835, filed on Jul. 29, 2002.

(51) Int. Cl.
*G06Q 40/00* (2006.01)
(52) U.S. Cl. ............................ 705/38; 705/39; 705/35
(58) Field of Classification Search ............... 705/39, 705/35, 38
See application file for complete search history.

(56) References Cited

U.S. PATENT DOCUMENTS

| | | | |
|---|---|---|---|
| 3,634,669 A | 1/1972 | Soumas et al. | |
| 3,713,235 A | 1/1973 | Roberts | |
| 4,058,220 A | 11/1977 | Torongo | |
| D248,203 S | 6/1978 | Morse | |
| 4,130,881 A | 12/1978 | Haessler et al. | |
| 4,465,206 A | 8/1984 | Sorel et al. | |
| 4,545,838 A | 10/1985 | Minkus et al. | |
| 4,614,861 A | 9/1986 | Pavlov et al. | |
| 4,634,845 A | 1/1987 | Riley et al. | |
| 4,643,452 A | 2/1987 | Chang et al. | |
| 4,689,478 A | 8/1987 | Hale et al. | |
| 4,700,055 A | 10/1987 | Kashkashian, Jr. | |
| 4,746,787 A | 5/1988 | Okada et al. | |
| 4,752,676 A | 6/1988 | Leonard et al. | |
| 4,754,418 A | 6/1988 | Hara | |
| 4,766,293 A | 8/1988 | Boston | |

(Continued)

FOREIGN PATENT DOCUMENTS

CA 2293321 12/1998

(Continued)

OTHER PUBLICATIONS

5500—FDIC General Counsel's Opinion No. 8—Stored Value Cards 61 Fed. Reg. 40490, http://www.fdic.gov/regulations/laws/rules/5500-500.html, Aug. 2, 1996.

(Continued)

*Primary Examiner* — Elizabeth Rosen
*Assistant Examiner* — Scott S Trotter
(74) *Attorney, Agent, or Firm* — Hunton & Williams, LLP

(57) ABSTRACT

Methods and systems for providing flexible financing are disclosed. In one embodiment, the present invention relates to a business card product with a customer activated credit line extension for accommodating large ticket purchases where the credit line extension may be linked to other business loan/lease products so that balances may be transferred to a customer's preferred financing product (or products). The purchases may be considered secured or unsecured loans/leases that may be capitalized as well as appreciate and depreciate in value. The purchases may include various types of revenue producing property, such as computer, office equipment, office furniture, copiers, farm equipment, and other types of revenue producing property.

16 Claims, 2 Drawing Sheets

U.S. PATENT DOCUMENTS

| | | |
|---|---|---|
| 4,766,539 A | 8/1988 | Fox |
| 4,789,928 A | 12/1988 | Fujisaki |
| 4,822,985 A | 4/1989 | Boggan et al. |
| 4,831,526 A | 5/1989 | Luchs |
| 4,837,422 A | 6/1989 | Dethloff et al. |
| 4,868,376 A | 9/1989 | Lessin et al. |
| 4,870,259 A | 9/1989 | Boggan et al. |
| 4,882,675 A | 11/1989 | Nichtberger et al. |
| D305,887 S | 2/1990 | Nishimura |
| 4,906,826 A | 3/1990 | Spencer |
| 4,908,521 A | 3/1990 | Boggan et al. |
| 4,923,288 A | 5/1990 | Allen et al. |
| 4,928,001 A | 5/1990 | Masada |
| 4,941,090 A | 7/1990 | McCarthy |
| 4,943,707 A | 7/1990 | Boggan |
| 4,953,085 A | 8/1990 | Atkins |
| 4,954,985 A | 9/1990 | Yamazaki |
| 4,961,142 A | 10/1990 | Elliott et al. |
| 4,968,873 A | 11/1990 | Dethloff et al. |
| 4,975,840 A | 12/1990 | DeTore et al. |
| 4,992,940 A | 2/1991 | Dworkin |
| 5,025,372 A | 6/1991 | Burton et al. |
| 5,049,728 A | 9/1991 | Rovin |
| 5,055,662 A | 10/1991 | Hasegawa |
| 5,080,748 A | 1/1992 | Bonomi |
| 5,146,068 A | 9/1992 | Ugawa et al. |
| 5,177,342 A | 1/1993 | Adams |
| 5,185,697 A | 2/1993 | Jacobs et al. |
| 5,191,522 A | 3/1993 | Bosco et al. |
| 5,202,286 A | 4/1993 | Nakatani |
| 5,206,488 A | 4/1993 | Teicher |
| 5,206,803 A | 4/1993 | Vitagliano |
| 5,214,700 A | 5/1993 | Pinkas et al. |
| 5,247,190 A | 9/1993 | Friend et al. |
| 5,276,311 A | 1/1994 | Hennige |
| 5,287,268 A | 2/1994 | McCarthy |
| 5,287,269 A | 2/1994 | Dorrough et al. |
| 5,297,026 A | 3/1994 | Hoffman |
| 5,311,594 A | 5/1994 | Penzias |
| 5,326,959 A | 7/1994 | Perazza |
| 5,328,809 A | 7/1994 | Holmes et al. |
| 5,339,239 A | 8/1994 | Manabe et al. |
| 5,350,906 A | 9/1994 | Brody et al. |
| 5,359,183 A | 10/1994 | Skodlar |
| 5,361,062 A | 11/1994 | Weiss et al. |
| 5,383,113 A | 1/1995 | Knight |
| 5,399,502 A | 3/1995 | Friend et al. |
| 5,401,827 A | 3/1995 | Holmes et al. |
| RE34,915 E | 4/1995 | Nichtberger et al. |
| 5,453,601 A | 9/1995 | Rosen |
| 5,455,407 A | 10/1995 | Rosen |
| 5,457,305 A | 10/1995 | Akel et al. |
| 5,477,040 A | 12/1995 | Lalonde |
| 5,479,494 A | 12/1995 | Clitherow |
| 5,483,445 A | 1/1996 | Pickering |
| 5,503,891 A | 4/1996 | Marshall et al. |
| 5,511,114 A | 4/1996 | Stimson et al. |
| 5,512,654 A | 4/1996 | Holmes et al. |
| 5,513,102 A | 4/1996 | Auriemma |
| 5,521,363 A | 5/1996 | Tannenbaum |
| 5,530,235 A | 6/1996 | Stefik et al. |
| 5,537,314 A | 7/1996 | Kanter |
| 5,544,086 A | 8/1996 | Davis et al. |
| 5,544,246 A | 8/1996 | Mandelbaum et al. |
| 5,577,109 A | 11/1996 | Stimson et al. |
| 5,581,064 A | 12/1996 | Riley et al. |
| 5,590,038 A | 12/1996 | Pitroda |
| 5,592,560 A | 1/1997 | Deaton et al. |
| 5,604,542 A | 2/1997 | Dedrick |
| 5,608,785 A | 3/1997 | Kasday |
| 5,612,868 A | 3/1997 | Off |
| 5,619,558 A | 4/1997 | Jheeta |
| 5,621,787 A | 4/1997 | McKoy et al. |
| 5,621,812 A | 4/1997 | Deaton et al. |
| 5,638,457 A | 6/1997 | Deaton et al. |
| 5,642,279 A | 6/1997 | Bloomberg et al. |
| 5,642,485 A | 6/1997 | Deaton et al. |
| 5,644,723 A | 7/1997 | Deaton et al. |
| 5,644,727 A | 7/1997 | Atkins |
| 5,649,114 A | 7/1997 | Deaton et al. |
| 5,649,117 A | 7/1997 | Landry |
| 5,649,118 A | 7/1997 | Carlisle et al. |
| 5,653,914 A | 8/1997 | Holmes et al. |
| 5,659,741 A | 8/1997 | Eberhardt |
| 5,664,110 A | 9/1997 | Green et al. |
| 5,664,157 A | 9/1997 | Takahira et al. |
| 5,665,953 A | 9/1997 | Mazzamuto |
| 5,672,678 A | 9/1997 | Holmes et al. |
| 5,675,607 A | 10/1997 | Alesio et al. |
| 5,675,662 A | 10/1997 | Deaton et al. |
| 5,677,955 A | 10/1997 | Doggett et al. |
| 5,684,291 A | 11/1997 | Taskett |
| 5,687,322 A | 11/1997 | Deaton et al. |
| 5,689,100 A | 11/1997 | Carrithers et al. |
| 5,692,132 A | 11/1997 | Hogan |
| 5,696,907 A | 12/1997 | Tom |
| 5,699,528 A | 12/1997 | Hogan |
| 5,704,046 A | 12/1997 | Hogan |
| 5,705,798 A | 1/1998 | Tarbox |
| 5,708,422 A | 1/1998 | Blonder et al. |
| 5,710,458 A | 1/1998 | Iwasaki |
| 5,710,887 A | 1/1998 | Chelliah |
| 5,710,889 A | 1/1998 | Clark et al. |
| 5,715,399 A | 2/1998 | Bezos |
| 5,717,925 A | 2/1998 | Harper et al. |
| 5,721,781 A | 2/1998 | Deo et al. |
| 5,726,884 A | 3/1998 | Sturgeon et al. |
| 5,727,153 A | 3/1998 | Powell |
| 5,728,998 A | 3/1998 | Novis et al. |
| 5,734,154 A | 3/1998 | Jachimowicz et al. |
| 5,734,838 A | 3/1998 | Robinson |
| 5,736,728 A | 4/1998 | Matsubara |
| 5,737,421 A | 4/1998 | Audebert |
| 5,740,549 A | 4/1998 | Reilly et al. |
| 5,742,775 A | 4/1998 | King |
| 5,745,049 A | 4/1998 | Akiyama et al. |
| 5,745,706 A | 4/1998 | Wolfberg et al. |
| 5,749,075 A | 5/1998 | Toader et al. |
| 5,760,381 A | 6/1998 | Stich et al. |
| 5,765,138 A | 6/1998 | Aycock et al. |
| 5,770,843 A | 6/1998 | Rose et al. |
| 5,770,849 A | 6/1998 | Novis et al. |
| 5,777,306 A | 7/1998 | Masuda |
| 5,777,903 A | 7/1998 | Piosenka et al. |
| 5,778,067 A | 7/1998 | Jones et al. |
| 5,789,733 A | 8/1998 | Jachimowicz et al. |
| 5,790,636 A | 8/1998 | Marshall |
| 5,794,207 A | 8/1998 | Walker |
| 5,798,950 A | 8/1998 | Fitzgerald |
| 5,799,087 A | 8/1998 | Rosen |
| 5,802,176 A | 9/1998 | Audebert |
| 5,805,719 A | 9/1998 | Pare et al. |
| 5,806,044 A | 9/1998 | Powell |
| 5,806,045 A | 9/1998 | Biorge |
| 5,807,627 A | 9/1998 | Friend et al. |
| 5,809,478 A | 9/1998 | Greco |
| 5,814,796 A | 9/1998 | Benson et al. |
| 5,815,657 A | 9/1998 | Williams et al. |
| 5,815,658 A | 9/1998 | Kuriyama |
| 5,819,234 A | 10/1998 | Slavin et al. |
| 5,819,237 A | 10/1998 | Garman |
| 5,826,243 A | 10/1998 | Musmanno et al. |
| 5,832,457 A | 11/1998 | O'Brien |
| 5,832,488 A | 11/1998 | Eberhardt |
| 5,835,061 A | 11/1998 | Stewart |
| 5,839,113 A | 11/1998 | Federau et al. |
| 5,845,259 A | 12/1998 | West et al. |
| 5,845,260 A | 12/1998 | Nakano et al. |
| 5,852,811 A | 12/1998 | Atkins |
| 5,852,812 A | 12/1998 | Reeder |
| 5,857,175 A | 1/1999 | Day |
| 5,859,419 A | 1/1999 | Wynn |
| 5,864,609 A | 1/1999 | Cross et al. |
| 5,864,828 A | 1/1999 | Atkins |
| RE36,116 E | 2/1999 | McCarthy |
| 5,870,721 A | 2/1999 | Norris |
| 5,875,437 A | 2/1999 | Atkins |

| | | | | | | |
|---|---|---|---|---|---|---|
| 5,883,377 | A | 3/1999 | Chapin, Jr. | 6,092,056 A | 7/2000 | Tull, Jr. et al. |
| 5,883,810 | A | 3/1999 | Franklin et al. | 6,095,412 A | 8/2000 | Bertina et al. |
| 5,884,271 | A | 3/1999 | Pitroda | 6,095,416 A | 8/2000 | Grant et al. |
| 5,884,278 | A | 3/1999 | Powell | 6,098,053 A | 8/2000 | Slater |
| 5,884,285 | A | 3/1999 | Atkins | 6,105,011 A | 8/2000 | Morrison, Jr. |
| 5,887,065 | A | 3/1999 | Audebert | 6,109,525 A | 8/2000 | Blomqvist et al. |
| 5,890,138 | A | 3/1999 | Godin et al. | 6,112,191 A | 8/2000 | Burke |
| 5,890,140 | A | 3/1999 | Clark et al. | 6,115,458 A | 9/2000 | Taskett |
| H1794 | H | 4/1999 | Claus | 6,119,097 A | 9/2000 | Ibarra |
| 5,897,620 | A | 4/1999 | Walker et al. | 6,119,103 A | 9/2000 | Basch et al. |
| 5,897,621 | A | 4/1999 | Boesch et al. | 6,119,107 A | 9/2000 | Polk |
| 5,905,246 | A | 5/1999 | Fajkowski | 6,119,932 A | 9/2000 | Maloney et al. |
| 5,907,350 | A | 5/1999 | Nemirofsky | 6,122,623 A | 9/2000 | Garman |
| 5,911,135 | A | 6/1999 | Atkins | 6,129,274 A | 10/2000 | Suzuki |
| 5,911,136 | A | 6/1999 | Atkins | 6,129,572 A | 10/2000 | Feldman et al. |
| 5,914,472 | A | 6/1999 | Foladare et al. | 6,134,309 A | 10/2000 | Carson |
| 5,920,629 | A | 7/1999 | Rosen | 6,134,536 A | 10/2000 | Shepherd |
| 5,920,844 | A | 7/1999 | Hotta et al. | 6,138,917 A | 10/2000 | Chapin, Jr. |
| 5,920,847 | A | 7/1999 | Kolling et al. | 6,145,741 A | 11/2000 | Wisdom et al. |
| 5,923,734 | A | 7/1999 | Taskett | 6,148,297 A | 11/2000 | Swor et al. |
| 5,930,217 | A | 7/1999 | Kayanuma | 6,161,096 A | 12/2000 | Bell |
| 5,931,764 | A | 8/1999 | Freeman et al. | 6,163,770 A | 12/2000 | Gamble et al. |
| 5,933,817 | A | 8/1999 | Hucal | 6,167,385 A | 12/2000 | Hartley-Urquhart |
| 5,937,068 | A | 8/1999 | Audebert | 6,169,975 B1 | 1/2001 | White et al. |
| 5,940,811 | A | 8/1999 | Norris | 6,173,267 B1 | 1/2001 | Cairns |
| 5,946,669 | A | 8/1999 | Polk | 6,182,048 B1 | 1/2001 | Osborn et al. |
| 5,952,641 | A | 9/1999 | Korshun | 6,182,894 B1 | 2/2001 | Hackett et al. |
| 5,953,423 | A | 9/1999 | Rosen | 6,186,793 B1 | 2/2001 | Brubaker |
| 5,953,710 | A | 9/1999 | Fleming | 6,189,787 B1 | 2/2001 | Dorf |
| 5,956,695 | A | 9/1999 | Carrithers et al. | 6,192,113 B1 | 2/2001 | Lorsch |
| 5,963,648 | A | 10/1999 | Rosen | 6,195,644 B1 | 2/2001 | Bowie |
| 5,963,925 | A | 10/1999 | Kolling et al. | 6,202,053 B1 | 3/2001 | Christiansen et al. |
| 5,970,479 | A | 10/1999 | Shepherd | RE37,122 E | 4/2001 | Levine et al. |
| RE36,365 | E | 11/1999 | Levine et al. | 6,213,392 B1 | 4/2001 | Zuppicich |
| 5,984,180 | A | 11/1999 | Albrecht | 6,223,143 B1 | 4/2001 | Weinstock et al. |
| 5,984,191 | A | 11/1999 | Chapin, Jr. | 6,227,447 B1 | 5/2001 | Campisano |
| 5,987,434 | A | 11/1999 | Libman | 6,243,688 B1 | 6/2001 | Kalina |
| 5,988,509 | A | 11/1999 | Taskett | 6,260,758 B1 | 7/2001 | Blumberg |
| 5,991,413 | A | 11/1999 | Arditti et al. | 6,263,316 B1 | 7/2001 | Khan et al. |
| 5,991,743 | A | 11/1999 | Irving et al. | 6,265,977 B1 | 7/2001 | Vega et al. |
| 5,991,748 | A | 11/1999 | Taskett | 6,278,981 B1 | 8/2001 | Dembo et al. |
| 5,999,596 | A | 12/1999 | Walker et al. | 6,295,344 B1 | 9/2001 | Marshall |
| 6,000,608 | A | 12/1999 | Dorf | 6,295,522 B1 | 9/2001 | Boesch |
| 6,002,383 | A | 12/1999 | Shimada | 6,298,336 B1 | 10/2001 | Davis et al. |
| 6,003,762 | A | 12/1999 | Hayashida | 6,308,268 B1 | 10/2001 | Audebert |
| 6,004,681 | A | 12/1999 | Epstein et al. | 6,324,524 B1 | 11/2001 | Lent et al. |
| 6,006,988 | A | 12/1999 | Behrmann et al. | 6,330,546 B1 | 12/2001 | Gopinathan et al. |
| 6,014,636 | A | 1/2000 | Reeder | 6,336,099 B1 | 1/2002 | Barnett et al. |
| 6,014,638 | A | 1/2000 | Burge et al. | 6,338,048 B1 | 1/2002 | Mori |
| 6,014,645 | A | 1/2000 | Cunningham | 6,343,743 B1 | 2/2002 | Lamla |
| 6,014,749 | A | 1/2000 | Gloor et al. | 6,345,766 B1 | 2/2002 | Taskett et al. |
| 6,016,482 | A | 1/2000 | Molinari et al. | 6,349,291 B1 | 2/2002 | Varma |
| 6,019,284 | A | 2/2000 | Freeman et al. | 6,360,954 B1 | 3/2002 | Barnardo |
| 6,021,189 | A | 2/2000 | Vu | 6,366,220 B1 | 4/2002 | Elliott |
| 6,026,370 | A | 2/2000 | Jermyn | 6,373,969 B1 | 4/2002 | Adler |
| 6,029,139 | A | 2/2000 | Cunningham et al. | 6,374,230 B1 | 4/2002 | Walker et al. |
| 6,029,144 | A | 2/2000 | Barrett et al. | 6,377,669 B1 | 4/2002 | Walker et al. |
| 6,029,890 | A | 2/2000 | Austin | 6,385,591 B1 | 5/2002 | Mankoff |
| 6,032,859 | A | 3/2000 | Muehlberger et al. | 6,385,594 B1 | 5/2002 | Lebda et al. |
| 6,038,292 | A | 3/2000 | Thomas | 6,386,444 B1 | 5/2002 | Sullivan |
| 6,041,315 | A | 3/2000 | Pollin | 6,397,202 B1 | 5/2002 | Higgins et al. |
| 6,044,360 | A | 3/2000 | Picciallo | 6,402,039 B1 | 6/2002 | Freeman et al. |
| 6,045,042 | A | 4/2000 | Ohno | 6,405,182 B1 | 6/2002 | Cuervo |
| 6,047,067 | A | 4/2000 | Rosen | 6,422,459 B1 | 7/2002 | Kawan |
| 6,047,268 | A | 4/2000 | Bartoli et al. | 6,422,462 B1 | 7/2002 | Cohen |
| 6,049,463 | A | 4/2000 | O'Malley et al. | 6,424,029 B1 | 7/2002 | Giesler |
| 6,049,773 | A | 4/2000 | McCormack et al. | 6,429,927 B1 | 8/2002 | Borza |
| 6,049,782 | A | 4/2000 | Gottesman et al. | 6,434,259 B1 | 8/2002 | Hamid et al. |
| 6,058,378 | A | 5/2000 | Clark et al. | D462,477 S | 9/2002 | Osborne |
| 6,064,985 | A | 5/2000 | Anderson | 6,446,210 B1 | 9/2002 | Borza |
| 6,065,675 | A | 5/2000 | Teicher | 6,450,407 B1 | 9/2002 | Freeman et al. |
| 6,068,183 | A | 5/2000 | Freeman et al. | 6,463,039 B1 | 10/2002 | Ricci et al. |
| 6,070,067 | A | 5/2000 | Nguyen et al. | 6,467,684 B2 | 10/2002 | Fite et al. |
| 6,070,147 | A | 5/2000 | Harms et al. | 6,473,500 B1 | 10/2002 | Risafi et al. |
| 6,076,068 | A | 6/2000 | DeLapa et al. | 6,481,125 B1 | 11/2002 | Pokrasoff |
| 6,076,072 | A | 6/2000 | Libman | 6,484,144 B2 | 11/2002 | Martin et al. |
| 6,078,888 | A | 6/2000 | Johnson, Jr. | 6,484,148 B1 | 11/2002 | Boyd |
| 6,078,891 | A | 6/2000 | Riordan et al. | 6,484,428 B1 | 11/2002 | Greenwald et al. |
| 6,091,817 | A | 7/2000 | Bertina et al. | D466,929 S | 12/2002 | Haas |

| | | |
|---|---|---|
| D467,271 S | 12/2002 | Haas |
| D467,272 S | 12/2002 | Haas |
| 6,498,861 B1 | 12/2002 | Hamid et al. |
| D468,789 S | 1/2003 | Arnold et al. |
| 6,505,095 B1 | 1/2003 | Kolls |
| 6,505,168 B1 | 1/2003 | Rothman et al. |
| 6,505,780 B1 | 1/2003 | Yassin et al. |
| 6,529,880 B1 | 3/2003 | McKeen et al. |
| D474,235 S | 5/2003 | Haas |
| 6,557,750 B1 | 5/2003 | Druse et al. |
| 6,557,766 B1 | 5/2003 | Leighton |
| 6,560,578 B2 | 5/2003 | Eldering |
| 6,561,657 B1 | 5/2003 | Schofield |
| 6,567,786 B1 | 5/2003 | Bibelnieks et al. |
| 6,567,821 B1 | 5/2003 | Polk |
| 6,574,603 B1 | 6/2003 | Dickson et al. |
| 6,581,839 B1 | 6/2003 | Lasch et al. |
| D476,681 S | 7/2003 | Al Amri |
| D477,359 S | 7/2003 | Haas |
| 6,601,040 B1 | 7/2003 | Kolls |
| 6,601,761 B1 | 8/2003 | Katis |
| 6,609,111 B1 | 8/2003 | Bell |
| RE38,255 E | 9/2003 | Levine et al. |
| 6,615,189 B1 | 9/2003 | Phillips et al. |
| 6,615,190 B1 | 9/2003 | Slater |
| 6,625,582 B2 | 9/2003 | Richman et al. |
| 6,631,849 B2 | 10/2003 | Blossom |
| 6,641,049 B2 | 11/2003 | Luu |
| 6,641,050 B2 | 11/2003 | Kelley et al. |
| 6,671,673 B1 | 12/2003 | Baseman et al. |
| D485,573 S | 1/2004 | Li |
| 6,675,127 B2 | 1/2004 | LaBlanc et al. |
| 6,675,149 B1 | 1/2004 | Ruffin et al. |
| 6,687,222 B1 | 2/2004 | Albert et al. |
| 6,693,544 B1 | 2/2004 | Hebbecker |
| 6,732,919 B2 | 5/2004 | Macklin et al. |
| 6,742,704 B2 | 6/2004 | Fitzmaurice et al. |
| 6,745,938 B2 | 6/2004 | Sullivan |
| 6,757,660 B2 | 6/2004 | Canada et al. |
| 6,757,710 B2 | 6/2004 | Reed |
| D495,736 S | 9/2004 | Scharf |
| 6,793,135 B1 | 9/2004 | Ryoo |
| 6,802,008 B1 | 10/2004 | Okada et al. |
| 6,805,287 B2 | 10/2004 | Bishop |
| 6,856,973 B1 | 2/2005 | Bott |
| 6,865,547 B1 | 3/2005 | Brake, Jr. et al. |
| 6,868,426 B1 | 3/2005 | Mankoff |
| 6,876,971 B1 | 4/2005 | Burke |
| D505,450 S | 5/2005 | Lauer et al. |
| 6,895,383 B2 | 5/2005 | Heinrich |
| 6,895,386 B1 | 5/2005 | Bachman et al. |
| 6,901,372 B1 | 5/2005 | Helzerman |
| 6,912,502 B1 | 6/2005 | Buddle et al. |
| 6,970,830 B1 | 11/2005 | Samra et al. |
| 6,978,369 B2 | 12/2005 | Wheeler et al. |
| 6,999,943 B1 | 2/2006 | Johnson et al. |
| 7,006,992 B1 | 2/2006 | Packwood |
| 7,051,925 B2 | 5/2006 | Schwarz, Jr. |
| 7,072,864 B2 | 7/2006 | Brake, Jr. et al. |
| 7,072,909 B2 | 7/2006 | Polk |
| 7,089,503 B1 | 8/2006 | Bloomquist et al. |
| 7,092,905 B2 | 8/2006 | Behrenbrinker et al. |
| 7,092,916 B2 | 8/2006 | Diveley |
| 7,104,443 B1 | 9/2006 | Paul et al. |
| 7,107,249 B2 | 9/2006 | Dively |
| 7,113,914 B1 | 9/2006 | Spielmann et al. |
| D533,220 S | 12/2006 | Graves et al. |
| 7,165,049 B2 | 1/2007 | Slater |
| D538,349 S | 3/2007 | Hollands |
| 7,216,091 B1 | 5/2007 | Blandina et al. |
| 7,225,155 B1 | 5/2007 | Polk |
| 7,243,839 B2 | 7/2007 | Beck et al. |
| 7,249,092 B2 | 7/2007 | Dunn et al. |
| 7,252,223 B2 | 8/2007 | Schofield |
| D551,705 S | 9/2007 | Mershon |
| 7,295,999 B1 | 11/2007 | Simon et al. |
| 7,315,843 B2 | 1/2008 | Diveley et al. |
| 7,346,567 B2 | 3/2008 | Weeks |
| 7,392,221 B2 | 6/2008 | Nabe et al. |
| 7,392,222 B1 | 6/2008 | Hamilton et al. |
| 7,392,224 B1 | 6/2008 | Bauer et al. |
| 2001/0011227 A1 | 8/2001 | Ashery et al. |
| 2001/0011243 A1 | 8/2001 | Dembo et al. |
| 2001/0027389 A1 | 10/2001 | Beverina et al. |
| 2001/0027441 A1 | 10/2001 | Wankmueller |
| 2001/0034647 A1 | 10/2001 | Marks et al. |
| 2001/0034682 A1 | 10/2001 | Knight et al. |
| 2001/0037315 A1 | 11/2001 | Saliba et al. |
| 2001/0044293 A1 | 11/2001 | Morgan |
| 2001/0047332 A1 | 11/2001 | Gonen-Friedman et al. |
| 2001/0047342 A1 | 11/2001 | Cuervo |
| 2001/0054003 A1 | 12/2001 | Chien et al. |
| 2001/0056398 A1 | 12/2001 | Scheirer |
| 2002/0019793 A1 | 2/2002 | Frattalone |
| 2002/0019803 A1 | 2/2002 | Muller |
| 2002/0026418 A1 | 2/2002 | Koppel et al. |
| 2002/0032609 A1 | 3/2002 | Wilkman |
| 2002/0046089 A1 | 4/2002 | Zorn |
| 2002/0046255 A1 | 4/2002 | Moore et al. |
| 2002/0062235 A1 | 5/2002 | Wahlbin et al. |
| 2002/0065720 A1 | 5/2002 | Carswell et al. |
| 2002/0077964 A1 | 6/2002 | Brody et al. |
| 2002/0077978 A1 | 6/2002 | O'Leary et al. |
| 2002/0082990 A1 | 6/2002 | Jones |
| 2002/0091572 A1 | 7/2002 | Anderson et al. |
| 2002/0091631 A1 | 7/2002 | Usui |
| 2002/0095365 A1 | 7/2002 | Slavin et al. |
| 2002/0099586 A1 | 7/2002 | Bladen et al. |
| 2002/0104878 A1 | 8/2002 | Seifert et al. |
| 2002/0111916 A1 | 8/2002 | Coronna et al. |
| 2002/0116271 A1 | 8/2002 | Mankoff |
| 2002/0116330 A1 | 8/2002 | Hed et al. |
| 2002/0120627 A1 | 8/2002 | Mankoff |
| 2002/0120642 A1 | 8/2002 | Fetherston |
| 2002/0129221 A1 | 9/2002 | Borgin et al. |
| 2002/0138418 A1 | 9/2002 | Zarin et al. |
| 2002/0143703 A1 | 10/2002 | Razvan et al. |
| 2002/0147662 A1 | 10/2002 | Anderson |
| 2002/0156723 A1 | 10/2002 | Lilly et al. |
| 2002/0165771 A1 | 11/2002 | Walker et al. |
| 2002/0165820 A1 | 11/2002 | Anvekar et al. |
| 2002/0169719 A1 | 11/2002 | Dively et al. |
| 2002/0174016 A1 | 11/2002 | Cuervo |
| 2002/0174018 A1 | 11/2002 | Bunger et al. |
| 2002/0178025 A1 | 11/2002 | Hansen et al. |
| 2002/0194081 A1 | 12/2002 | Perkowski |
| 2003/0004828 A1 | 1/2003 | Epstein |
| 2003/0018613 A1 | 1/2003 | Oytac |
| 2003/0023549 A1 | 1/2003 | Armes et al. |
| 2003/0028518 A1 | 2/2003 | Mankoff |
| 2003/0033211 A1 | 2/2003 | Haines et al. |
| 2003/0033246 A1 | 2/2003 | Slater |
| 2003/0046249 A1 | 3/2003 | Wu |
| 2003/0053609 A1 | 3/2003 | Risafi et al. |
| 2003/0074290 A1 | 4/2003 | Clore |
| 2003/0101119 A1 | 5/2003 | Persons et al. |
| 2003/0105672 A1 | 6/2003 | Epstein et al. |
| 2003/0110111 A1 | 6/2003 | Nalebuff et al. |
| 2003/0135462 A1 | 7/2003 | Brake, Jr. et al. |
| 2003/0140004 A1 | 7/2003 | O'Leary et al. |
| 2003/0144935 A1 | 7/2003 | Sobek |
| 2003/0154125 A1 | 8/2003 | Mittal et al. |
| 2003/0163403 A1 | 8/2003 | Chen et al. |
| 2003/0163416 A1 | 8/2003 | Kitajima |
| 2003/0172040 A1 | 9/2003 | Kemper et al. |
| 2003/0195808 A1 | 10/2003 | Brown et al. |
| 2003/0200143 A9 | 10/2003 | Walker et al. |
| 2003/0200180 A1 | 10/2003 | Phelan et al. |
| 2003/0204421 A1 | 10/2003 | Houle et al. |
| 2003/0216965 A1 | 11/2003 | Libman |
| 2003/0229525 A1 | 12/2003 | Callahan et al. |
| 2004/0024672 A1 | 2/2004 | Brake, Jr. et al. |
| 2004/0030626 A1 | 2/2004 | Libman |
| 2004/0039588 A1 | 2/2004 | Libman |
| 2004/0059952 A1 | 3/2004 | Newport et al. |
| 2004/0064402 A1 | 4/2004 | Dreyer et al. |
| 2004/0093296 A1 | 5/2004 | Phelan et al. |
| 2004/0093303 A1 | 5/2004 | Picciallo |

| | | | |
|---|---|---|---|
| 2004/0098351 | A1 | 5/2004 | Duke |
| 2004/0103431 | A1 | 5/2004 | Davenport et al. |
| 2004/0118914 | A1 | 6/2004 | Smith et al. |
| 2004/0128186 | A1 | 7/2004 | Breslin et al. |
| 2004/0193539 | A1 | 9/2004 | Sullivan |
| 2004/0215507 | A1 | 10/2004 | Levitt et al. |
| 2004/0243498 | A1 | 12/2004 | Duke |
| 2005/0021353 | A1 | 1/2005 | Aviles et al. |
| 2005/0021400 | A1 | 1/2005 | Postrel |
| 2005/0021457 | A1 | 1/2005 | Johnson et al. |
| 2005/0027649 | A1 | 2/2005 | Cech |
| 2005/0035192 | A1 | 2/2005 | Bonalle et al. |
| 2005/0071230 | A1 | 3/2005 | Mankoff |
| 2005/0075932 | A1 | 4/2005 | Mankoff |
| 2005/0077350 | A1 | 4/2005 | Courtion et al. |
| 2005/0091138 | A1 | 4/2005 | Awatsu |
| 2005/0102228 | A1 | 5/2005 | Srinivasan et al. |
| 2005/0108152 | A1 | 5/2005 | Tsoa-Lee et al. |
| 2005/0119979 | A1 | 6/2005 | Murashita et al. |
| 2005/0171898 | A1 | 8/2005 | Bishop et al. |
| 2005/0199705 | A1 | 9/2005 | Beck et al. |
| 2005/0234771 | A1 | 10/2005 | Register et al. |
| 2005/0269396 | A1 | 12/2005 | Schofield |
| 2006/0026092 | A1 | 2/2006 | Klein et al. |
| 2006/0036553 | A1 | 2/2006 | Gupta et al. |
| 2006/0047573 | A1 | 3/2006 | Mitchell et al. |
| 2006/0047589 | A1 | 3/2006 | Grau |
| 2006/0074794 | A1 | 4/2006 | Nespola |
| 2006/0085334 | A1 | 4/2006 | Murphy |
| 2006/0106696 | A1 | 5/2006 | Carlson |
| 2006/0116903 | A1 | 6/2006 | Becerra |
| 2006/0122918 | A1 | 6/2006 | Graboske et al. |
| 2006/0131869 | A1 | 6/2006 | Brignull |
| 2006/0224480 | A1 | 10/2006 | Bent et al. |
| 2006/0242057 | A1 | 10/2006 | Velarde |
| 2006/0251478 | A1 | 11/2006 | Desmeules |
| 2008/0177659 | A1 | 7/2008 | Lacey et al. |

FOREIGN PATENT DOCUMENTS

| | | |
|---|---|---|
| EP | 0843292 A2 | 5/1998 |
| EP | 0855659 | 7/1998 |
| EP | 959440 | 11/1999 |
| GB | 2275654 A | 9/1994 |
| GB | 2376787 | 12/2002 |
| GB | 2377071 | 12/2002 |
| GB | 2377314 | 1/2003 |
| WO | WO 94/29112 | 12/1994 |
| WO | WO 97/41673 | 11/1997 |
| WO | WO 98/59307 | 12/1998 |
| WO | WO 99/05633 | 2/1999 |
| WO | WO 99-54841 | 10/1999 |
| WO | WO 01/18699 | 3/2001 |
| WO | WO 01/69347 | 9/2001 |
| WO | WO 01/69347 A2 | 9/2001 |
| WO | WO 01/69347 A3 | 9/2001 |
| WO | WO 2005/043227 A3 | 5/2005 |

OTHER PUBLICATIONS

Song, A Card That Asks for ID, Time Magazine, Apr. 12, 2004, 1 page.
A Store Card Issuer Looks for Lift from Electronic Gift Certificates, Credit Card News, Feb. 1, 1995, 2 pages.
Claessens, et al., A Tangled World Wide Web of Security Issues, First Monday, retrieved from the internet at http://www.firstmonday.org/issues/issue7_3/claessens, retrieved from the internet on Oct. 6, 2006.
Hotchkiss, ATM's at the head of their class, Bank Marketing, vol. 29, No. 3, Mar. 1997, pp. 26-32.
Edwards, ATMs the Hot New Media Buy, ABA Banking Journal, Mar. 1999, pp. 58, 60.
American Express Incentive Services, Incentive, Sep. 1996, p. 126.
Fickenscher, Amex Prepaid Offering is Latest Card for Firms Regarding Employees, American Banker, vol. 161, No. 151, Aug. 8, 1996, pp. 1-2.
Neumann, An Enhanced Neural Network Technique for Software Risk Analysis, IEEE Transactions on Software Engineering, vol. 28, No. 9, Sep. 1, 2002, pp. 904-912.
Associates First Capital Corporation, Hoover's Inc., The Industry Standard: The Newsmagazine of the Internet Economy, thestandard.net/companies/company-display, Apr. 6, 1999.
Award Card Comparison, JA7922.
Brehl, Banks issue cash-card pledge, The Toronto Star, Oct. 9, 1997, 1 page.
Blockbuster running test of a stored value card, The American Banker, Sep. 1, 1995.
Meece, Boatman's Prepaid Cards for Worker-Incentive Firm, American Banker, Jul. 2, 1996, p. 12.
Boatmen's Floats Stored Value into the Employee Incentive Waters, Debit Card News vol. 2, issue 2, Jul. 16, 1996, 3 pages.
CES/NaBANCO introduces stored value card technology blockbuster video is first merchant partner, Business Wire, Inc., Jan. 15, 1996.
Card Based Award Systems, JA8309.
CardEx Incentives, www.cardex.com, Apr. 6, 1999.
CardFlash, Apr. 5, 2005.
Vandenengel, Cards on the Internet: Advertising on a $3 Bill, Industry intelligence, Feb. 1, 1995, pp. 46-48.
Kutler, Cash Card Creator Looking Beyond Mondex, Feb. 9, 1995.
Rosen, Cash Just Isn't Flexible Enough: Shops of the Future Will Only Take Cards, Daily Express, Technology Section, Feb. 10, 1995, 1 page.
Bank, Cash, Check,Charge—What's Next?, Seattle Times, Mar. 6, 1995.
Morgan et al., Categorizing Risks for Risk Ranking. vol. 20, No. 1, Jun. 22, 2005, pp. 49-58.
Common electronic purse specifications, Business Requirements, Version 6.0, Dec. 1998.
Guidotti, Comparing Environmental risks: A Consultative Approach to Setting Priorities at the Community Level, Public Health Rev 1994, vol. 22, Jun. 16, 2005, pp. 321-337.
Britt, Competing in Auto Lending, America's Community Banker, vol. 5, No. 11, Nov. 1, 1996, pp. 33-37.
Consortium created to manage common electronic purse specification, Cardtech Securtech, Chicago, www.visa.com/av/news/PRmisc051199.vhtml, May 11, 1999.
Nora Wood, Corporate Spotlight, Incentive, Dec. 1997, 4 pages.
Mobasher et al., Creating Adaptive Web Sites Through Usage-Based Clustering of URLs, Knowledge and Data Engineering Exchange Workshop, Chicago, IL and Los Alamitos, CA, 1999, pp. 19-25.
Lamond, Credit Card Transactions Real World and Online, Paying by Credit Card-Real World and Online, http://www.virtualschool.edu/mon/ElectronicProperty/klamond/credit, printed Jul. 8, 2005, 17 pages.
D.C. Area Safeway Stores Look for Increase in Sales Volume and Revenue with Cards, Card News, vol. 6, No. 25, Dec. 30, 1991, pp. 7-9.
Piskora, Debit Cards Seen Poised for New Markets, American Banker, Credit/Debit/ATMs, Mar. 7, 1995, p. 16.
E-Z Pass, Web page, http://vvww.ezpass.com-Disc_portNewYork,html, Nov. 12, 2001.
E-Z Pass, Web page, http:\\www.ezpass.com-Disc_ny_annual.html, Nov. 12, 2001.
E-Z Pass, Web page, http:\\www.ezpass.com-frameMain.html Nov. 12, 2001.
E-Z Pass, Web page, http:\\www.ezpass.com-whatis.html, Nov. 12, 2001.
Eight Keys to Making the Right Choice, Incentive, Dec. 1996, 9 pages.
D. O'Mahony, Electronic Payment System, 1997, Artech House, XP002137255, p, 7-11.
Business Times, Electronic Purse Can Free You from ATM Drag, Business Times, www.btimes.co.za, printed Feb. 23, 2001, 1 page.
Electronic Purse, SCIA (Smart Card Industry Association), About Smart Cards, www.scia.org, printed Feb. 23, 2001, 1 page.
Sanchez-Klein, Electronic purse alliance planned. Computerworld Online News, Jul. 29, 1998, printed Feb. 23, 2001, 2 pages.
Electronic purse card to be launched tomorrow, New Straits Times, News Clippings, Sep. 18, 1999, printed Feb. 23, 2001, 3 pages.
Exclusively Yours From Maritz . . . The MasterCard Card Ultimate Incentive, Incentive, Oct. 1995, 3 pages.

Block, First Data Subsidiary Creates Payroll Card for the Bankless. LexisNexis Academic, Credit/Debit/ATMs, p. 10, Mar. 21, 1997.
First Data markets stored-value cards, Cards International, Jan. 30, 1996, p. 5.
First USA—Activate Today and Get One Hour Free Calling Card Calls, Call 1-800-555-2535, First USA, 6 pages.
First USA—Call 1(800)335-2453 to Receive One Free Hour of Domestic Long Distance Calling (No Strings Attached), First USA, 6 pages.
First USA Platinum Connect, First USA Bank, First USA Promotional Mailing, Oct. 1997, 6 pages.
First Union Issues Smart Cards to Fort Benning Recruits, CardFax, vol. 1999, No. 60, Mar. 26, 1999, 1 page.
Norris, First data unit develops blockbuster cash card, Omaha World Hearld Sunrise Edition, Business Section, Jan. 19, 1996, p. 16.
Frequently asked questions, ECARD, www.eregard.com, printed Sep. 23, 2001, 7 pages.
Glossman, et al.,, Glossman, et al., Citicorp Company Report, Report No. 1647151, p. 8 of 16.
Machlis, Have it the smart way: Burger King program drives smart-card use, Computerworld, printed Feb. 23, 2001, 1 page.
Here's the calling convenience you asked for: 1-600-call-ATT . . . for All Calls, AT&T, Appendix A: For Card Carriers, 1999, 7 pages.
Hoovers, General Mills, Inc. Corporate Profile relied upon to show the history of the company, http:/cobrands.hoovers.com/global/cobrands/proquest/history.xhtml?COID=10639, Jul. 12, 2005, 2 pages.
How Is It Different?, JA8331.
Konrad, IBM Had a Bunch of Unusual Ideas in 2003, www.philly.com, printed Jan. 21, 2064, posted on Jan. 13, 2004, 2 pages.
Incenticard, Bellsouth, JA8329.
Judy Quinn, Incentive Cards Explained, Incentive, Dec. 1995, 5 pages.
Incentive Firms Find Debit Cards a Rewarding Experience (Off-line debit card issuers converge efforts with companies looking for effective incentives to boost employee productivity and to motivate individuals to buy their products), Debit Card News, vol.
Vincent Alonzo, Incentive Marketing . . . Three If by Smart Card, Incentive Sep. 1995, p. 11.
Incentive gift Card: Another way to give the gift of choice!, Incentive, Aug. 1995, 2 pages.
Coulton, Incentives Field Moving to Card-Based Series 14, American Banker, Mar. 26, 1998, 3 pages.
Introducing SpendingMoney(TM), Armetta. Marketing & Design Product Concept Report, Oct. 9, 1996, 15 pages.
Introducing the First USA Platinum Connect Card, First USA Promotional Mailing, Dec. 1997, 2 pages.
Key Bank Holiday Offer, http://wwvw.key.com/swiftgift/home.html, printed Apr. 5, 1999.
LexisNexis Academic, Debit Card Innovation, vol. XXXV, No. 5. p. 2. May 1997.
LexisNexis Academic, Debit Cards: Payroll Card Ups Fees, Future Banker, p. 18, Oct. 6, 1997.
LexisNexis Academic, NTS' TransPay Debit Card Helps Remote and Unbanked Employees Get Funds Quicker, Financial News, Mar. 18, 1997.
MailFrontier Survey Finds that Consumers Hold Financial Institutions Accountable for Online Identitiy Theft, www.mailfrontier.com, Palo Alto, CA, Nov. 2004.
O'Conner, Maritz Gets MasterCard's Stamp of Approval, Business Travel News, Aug. 19, 1996, 2 pages.
Maritz, Incentive, Jun. 1996, p. 111.
Meridian Award Cards, JA8251.
Meridian-the leader in card marketing. JA8343.
Meridicard vs. Debit Cards, JA7917.
Clark, Microsoft, Visa to Jointly Develop PC Electronic-Shopping Software, The Wall Street Journal, Nov. 9, 1994, WSJ B9.
More Retailers Turn to Co-Branding, Chain Store Age Executive with Shopping Center Age, Feb. 1, 1995, 3 pages.
Bogle, Mutual Funds at the Millennium: Fund Directors and Fund Myths, The Vanguard Group to the '40 Act Institute of PLI (Practicing Law Institute), New York, NY, May 15, 2000, 15 pages.
New 1-800-Call-ATT Campaign Promotes One Number for All Calls, AT&T Marketing, News Release, www.att.com/press/0297/970217.csa.htm, Feb. 17, 1997, 2 pages.
Schwab, Charles, Now 7 ways for a better Total Return for Your Money; Schwat 1, The Inventor's Asset Management Account, Charles R. Schwab, Charles Schwab & Co., Inc., 16 pages.
Allen et al., Overview of Smart Cards and the Industry, Smart Cards: Seizing Strategic Business Opportunities, Chapter 1, p. 2-20, Irwin Professional Pubishing, 1997.
Paper or Plastic? With these three incentives, The Choice is Yours, Incentive, Feb. 1996, 2 pages.
Dugas, Payroll May Ask: Paper or Plastic?, USA Today, 3B, Aug. 14, 2001, 1 page.
Proton world and Europay to co-operate in creation of new CEPS-compliant e-purse application, Press Release 1999, Waterloo, Belgium, Jun. 28, 1999, 2 pages.
Brown et al., Purchasing Card Magic: Eli Lilly Finds Accounts Payable Flying High With Plastic, Corporate Cashflow, vol. 15, No. 12, Nov. 1994, 2 pages.
Purse Application for Cross Border Use in Euro. Cordis, Pace 1st 1999-11531 Pace, www.cordis.lu, printed Feb. 23, 2001, 3 pages.
SK100 Smart Card Electronic Purse Balance Reader, SK100 Balance Reader, http://perso.wanadoo.fr, printed Feb. 23, 2001, 1 page.
Miller, Section E2.1: Kerberos Authentication and Authorization System, Project Athena, Cambridge, MA, Dec. 21, 1987, 39 pages.
Souccar, Smart Cards: 1st Union Smart Card Pilot Enlists a Second Army Base, American Banker, Digital Frontiers, vol. 164, No. 61, Mar. 31, 1999, 3 pages.
Smart Cards: Big Brother's Little Helpers, The Privacy Committee of New South Wales, No. 66, Aug. 1995.
Smart card for loyalty and e-purse applications eclipses capability of conventional mag-stripe cards, Press Release. www.1.sib.com, Apr. 21, 1997, printed Feb. 23, 2001, 3 pages.
SmartAxis: Load Cash on to your E-Purse Card, Supported Currencies and Schemes, www.smartaxis.co.uk, printed Feb. 23, 2001. 9 pages.
Spurgin, Sopininmon! or What's Happening in the Retail Credit Card Environment. Credit World Journal, vol. 85, No. 4, Mar. 1, 1997, pp. 20-23.
Lacker, Stored Value Cards: Costly Private Substitutions for Government Currency, Economic Quarterly, 1996, Economic Quarterly, v82, n3, p1(25), ISSN: 1060-7225, 17 pages.
Lazarony, Stuck for a gift? Give a prepaid credit card, www,bankrate.com, Dec. 21, 1998, 1 page.
KEY, Swift Gift 'Wows' InternetShoppers, PR Newswire. www.key.com/swiftgift/home.html, Dec. 2, 1998, 1 page.
The Campus Card Conundrum, Card Technology, Journal ISSN: 1093-1279, p. 25+, Feb. 1998, pp. 1-8.
The Electronic Purse Reaches the Car Park, http:\\docs.vircom.net/mobility/parking, printed Feb. 23, 2001, 2 pages.
The Evolution of a New Consumerism, Chain Store Age, vol. 73, Jun. 1997, pp. 8-9.
The Federal Transit Administration, TCRP Report 32 Multipurpose Transit Payment Media, Chapter 2 Multipurpose Fare Payment: Overview, p. 10-20.
Stoughton, The Gift of Credit, www.washingtonpost.com/wp-srv/business, Dec. 14, 1998.
Nora Wood, The Power of the Card, Incentive, Jul. 1997, 6 pages.
Stuber, The electronic purse: An overview of recent development and issues, Bank of Canada, Technical Report No. 74, www.bankofcanada.ca, Jan. 1996, printed Feb. 23, 2001, 2 pages.
Understanding the benefits: Smartcity offers a number of important benefits to both the card issuers and their customers, http://www.icl.com/smartcards/benefits.htm, printed Feb. 27, 2001, 2 pages.
Langheinrich et al., Unintrusive Customization Techniques for Web Advertising, Computer Networks, vol. 31, 1999, pp. 1259-1272.
Universal Card free lifetime membership extended 3 months, AT&T Marketing, www.att.com/press/0297/970217.csa.html, Dec. 4, 1990, 2 page.
Visa Cash—Where can I get it?, www.visa-asia.com/pd/cash/where.html, Feb. 23, 2001.
Visa Cash, www.visa-asia.com/pd/cash/main.html, Feb. 23, 2001.

Visa International and SERMEPA Announce Plans for Cross Border Visa Cash Based on CEPS, www.visa.com/av/news/praaamisc111699.vhtml, Nov. 16, 1999.
Visa first to launch electronic purse load via GSM mobile phone, www.cellular.co.za, Johannesburg, ZA, printed Feb. 23, 2001, 4 pages.
Visa releases visa cash electronic purse specifications based on CEPS, www.visa.com/av/news/PRaamisc042099.vhtml, San Francisco, Apr. 20, 1999.
Hansell, Visa to unveil electronic purse cards. New York Times, printed Feb. 23, 2001, 2 pages.
Welcome to Card Express CardEx, CardEx website archived by web.archive on Oct. 31, 1996, http://web.archive.org/web/*/http://www.cardex.com, retrieve Oct. 18, 2003, 7 pages.
Welcome to Card Express, The CardEx Incentive Card, as disclosed in the CardEx web site archived by web.archive.org on Feb. 7, 1998, http://web.archive.org/web/*/http://www.cardex.com, retrieve Oct. 18, 2003, 8 pages.
Swiftgift, Welcome to Swiftgift, www.swiftgiftcard.com, Dec. 8, 1998, 10 pages.
Kenneth Hein, What's the Deal?, Incentive, Jul. 1996, 7 pages.
Machlis et al., Will smart cards replace ATMS?, Computerworld, printed Feb. 23, 2001, 3 pages.
Hight, Jim, Consulting Services, www.strategies-tactics.com.
Definition of Store-Value Card, Wikipedia, retrieved from the internet at http://en.wikipedia.org/wiki/Stored-value_card, retrieved from the internet on Apr. 16, 2007.
Harney, Kenneth, Home Asset Management Accounts Link Mortgages Equity Lines.
Rossman, Kenneth, Summary Appraisal of Real Property.
Wells Fargo Blazes New Trait for Homeowners.
CardEx Incentives, Apr. 6, 1999, www.cardexco.com, 15 pages.
"Associates First Capital Corporation", Hoover's Inc., The Industry Standard: The Newsmagazine of the Internet Economy, thestandard.net/companies/cpmpany-dispay, Apr. 6, 1999, 2 pages.
Jeffrey M. Lacker, "Stored Value Cards: Costly Private Substitutions for Government Currency", Economic Quarterly, 1996, 17 pages.
"The Evolution of a New Consumerism" Chain Store Age, vol, 73, 4 pages, Jun. 1997.
Lisa Fickenscher, "Amex prepaid offering is latest card for firms regarding employees", American Banker, vol. 161, No. 151, 2 pages, Aug. 8, 1996.
"Welcome to Swiftgift", Swiftgift, www.swiftgiftcard.com Dec. 8, 1998, 10 pages.
Lucy Lzarony, "Stuck for a gift? Give a prepaid credit card", www.bankrate.com, Dec. 21, 1998, 2 pages.
Antoinette Coulton, "Incentives field moving to card-based series 14", American Banker, Mar. 26, 1998, 3 pages.
Credit Card News, "A store card issuer looks for lift from electronic gift certificates", Feb. 1, 1995, 2 pages.
Stefani C. O'Conner, Business Travel News. "Maritz gets mastercard's stamp of approval", Aug. 19, 1996, 2 pages.
Debit Card News, vol. 2, Issue 2, "Boatmen's floats stored value into the employee incentive waters", Jul. 16, 1996, 3 pages.
Mickey Meece, "Boatman's prepaid cards for worker-incentive firm". American Banker, Jul. 2, 1996, 1 page.
Card News, vol. 6, No. 25, "D.C. Area Safeway stores look for increase in sales volume and revenue with cards", Dec. 1991, 3 pages.
Ralph E. Spurgin, "Sopininmon! or What's happening in the retail credit environment" Credit World Journal, Apr. 1997, 7 pages.
AT&T Marketing, "Universal card free lifetime membership extended 3 months", www.att.com/press/0297/970217.csa.html, Dec. 4, 1990, 2 pages.
Chain Store Age Executive with Shopping Center Age, "More retailers turn to co-branding", Feb. 1, 1995, v.71, n. 2, ISSN: 0193-1199, 3 pages.
Introducing SpendingMeney(TM), Armetta: Marketing & Design Product Concept Report, Oct. 9, 1996, 15 pages.
Introducing the First USA Platinum Connect Card, First USA Promotional Mailing, Dec. 1997, 6 pages.
Here's the calling convenience you asked for; 1-800-call-AT&T . . . For All Calls, Appendix A: for Card Carriers, 7 pages.
Beth Piskora, Debit Cards Seen Poised for New Markets, American Banker, Mar. 7, 1995, 1 page.
Nick Rosen, Cash Just Isn't Flexible Enough: Shops of the Future Will Only Take Cards, Daily Express: Technology Section, Feb. 10, 1995, 1 page.
Phil Britt, Competing in Auto Lending, America's Community Banker, vol. 5, No. 11, Nov. 1, 1996, 7 pages.
Miriam Krenin Souccar, Smart Cards: 1st Union Smart Card Pilot Enlists a Second Army Base, American Banker, 3 pages.
First Union Issues Smart Cards to Fort Benning Recruits, CardFax, 1 page.
Emerson Brown and Jim Baum, Purchasing Card Magic: Eli Lilly Finds Accounts Payable Flying High With Plastic, Corporate Cashflow, 4 pages.
Swift Gift 'Wows' Internet Shoppers, PR Newswire, Dec. 2, 1998, 2 pages.
Incentive Firms Find Debit Cards a Rewarding Experience, Debit Card News, v.3, n.11, Nov. 28, 1997, 3 pages.
Christine Dugas, Payroll May Ask: Paper or Plastic?. USA Today, 3B, Aug. 14, 2001.
AT&T News Release, New 1-800-CALL-ATT campaign promotes one number for all calls, Feb. 17, 1997, 2 pages.
Judy Feldman, Pay by check over the phone or Net, Oct. 1999, Money, vol. 28, Iss, 10, p. 178.
Jeff Ostroff, Guide to Buying New Cars, Used Cars, Dealer Scams, Feb. 2, 1001 CarBuyingTips.com.
Unknown, E-Loan, Apr. 4, 2001, eloan.com.
Unknown, E-Loan FAQ, Apr. 7, 2001, eloan.com.
Unknown, The Bank Credit Card Business, 1996, The American Bankers Association, Second Edition, pp. 45 and 60.
Joes G. Siegel et al., Accounting Handbook, 1995, Barron's Educational Series, Inc. $2^{nd}$ Edition, pp. 183, 192, 194, 195.
Arkansas Code of 1987 Annotated, 1999. The State of Arkansas, 4-9-107 & 4-9-103.
The Bank Credit Card Business, 1996, The American Bankers Association, $2^{nd}$ Edition, p. 60.
Charles Haddad et al., "Congradulations, Grads", May 21, 2001. BusinessWeek, Iss. 3733, 1 p. 48.
Unknown, Patent Assignment Abstract of Title, Dec. 31, 2007 U.S. Patent and Trademark Office.

METHOD AND SYSTEM FOR PROVIDING FLEXIBLE FINANCING

RELATED APPLICATIONS

This patent application is a Continuation of U.S. patent application Ser. No. 10/436,462 filed May 13, 2003 now U.S. Pat. No. 7,676,425 and claims Priority to U.S. Provisional Application No. 60/398,835 filed Jul. 29, 2002, which are hereby incorporated by reference herein in their entirety.

CROSS-REFERENCE TO RELATED APPLICATIONS

This patent application claims priority to U.S. Provisional Patent Application No. 60/398,835, filed Jul. 29, 2002, which is hereby incorporated by reference herein in its entirety.

FIELD OF THE INVENTION

The present invention relates generally to providing flexible financing and, more particularly, to a method and system for providing flexible financing through a card product where a consumer (e.g., individual, small business or other consumer entity) may initiate a request for funding a purchase (e.g., revenue producing property) where the purchase may be transformed into a secured loan or an unsecured loan, depending on the consumer's credit information (e.g., credit standing).

BACKGROUND OF THE INVENTION

Small businesses experience constant cash flow challenges. For example, a small business' ability to make purchases or conduct in other transactions may be subject to the timing of receivables and payables. Large ticket purchases can be especially challenging. Such large ticket purchases may include computers, equipment, inventory, office space, furnishings and other items.

When consumers (e.g., small businesses) attempt to make large purchases, one option is a merchant finance plan. Merchants offer financing at the point of sale, which is more convenient; however, the rates that are offered to consumers are oftentimes less favorable. The consumer may feel pressured at the point of sale to agree to the merchant finance plan. As a result, the consumer is left with no choice but to accept the less favorable rates to complete the purchase. The point-of-sale experience can be time-consuming and frustrating. Another option may involve obtaining pre-approved financing from a financial institution before each large purchase is made. However, this requires a great deal of planning and makes last minute purchases difficult. Consumers may also attempt to use multiple credit cards (business cards and personal cards) to balance multiple large purchases. However, this becomes difficult to manage with varying interest rates and other restrictions.

In view of the foregoing, it would be desirable to provide a method and system for providing flexible financing which overcomes the above-described inadequacies and shortcomings.

SUMMARY OF THE INVENTION

According to an embodiment of the present invention, a method and a system for providing flexible financing to consumers are provided. In one particular exemplary embodiment, the present invention relates to a business card product with a customer activated credit line extension for accommodating purchases, such as large ticket purchases, where the credit line extension may be linked to other business loan/lease products so that balances may be transferred to a customer's preferred financing product (or products).

According to an exemplary embodiment of the present invention, a computer implemented method for providing customer initiated flexible financing for one or more purchases comprises the steps of issuing a card product to a customer for financing at least one revenue producing property; receiving a request from the customer for financing a future purchase of the at least one revenue producing property; authorizing the future purchase of the at least one revenue producing property to enable the customer to purchase the at least one revenue producing property with the card product; and receiving a customer contact after the purchase is made for designating one or more financing options for the financing of the at least one revenue producing property.

According to another exemplary embodiment of the present invention, a system for providing customer initiated flexible financing for one or more purchases comprises a card issuing module for issuing a card product to a customer for financing at least one revenue producing property; a request receiving module for receiving a request from the customer for financing a future purchase of the at least one revenue producing property; an authorizing module for authorizing the future purchase of the at least one revenue producing property to enable the customer to purchase the at least one revenue producing property with the card product; and a designating module for receiving a customer contact after the purchase is made for designating one or more financing options for the financing of the at least one revenue producing property.

According to yet another exemplary embodiment of the present invention, a computer implemented method for initiating flexible financing for one or more purchases comprises the steps of receiving a card product from a provider for financing at least one revenue producing property; contacting the provider for flexible financing for a future purchase of the at least one revenue producing property; receiving authorization for the future purchase of the at least one revenue producing property from the provider; purchasing the at least one revenue producing property with the card product; and contacting the provider after the purchase of the at least one revenue producing property for designating one or more financing options for the financing of the purchase.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

An embodiment of the present invention relates to a card product (e.g., business, personal or other) with a customer activated line extension to accommodate purchases (e.g., large ticket purchases) where the credit line extension may be linked to other loan/lease products (e.g., business or personal) so that balances may be transferred to a customer's preferred financing product or products. According to an embodiment of the present invention, the purchases may be considered secured or unsecured loans/leases that may be capitalized as well as appreciate and depreciate in value. The purchases may include various types of revenue producing property, such as computer, office equipment, office furniture, copiers, farm equipment, and other types of property.

Figure 1:
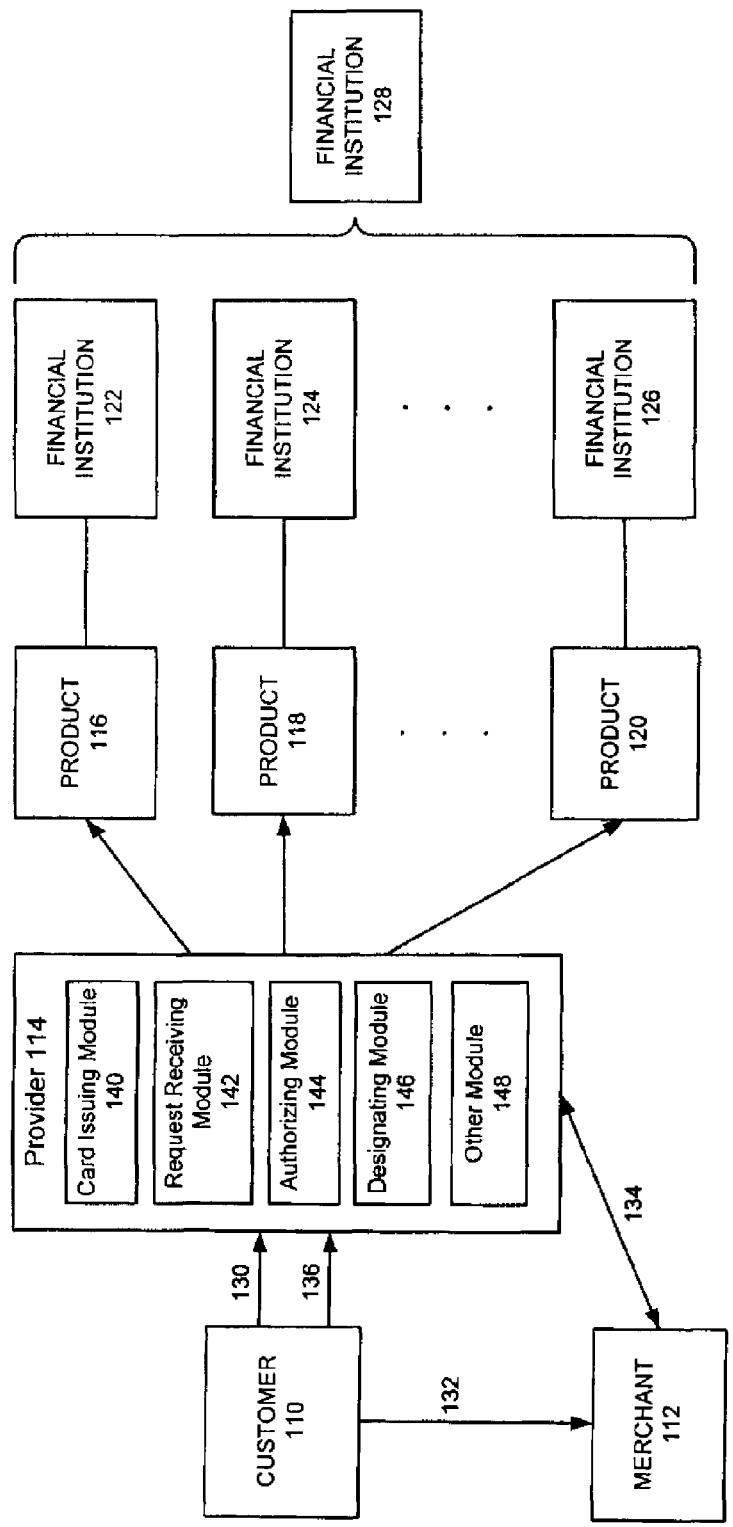
FIG. 1 is a diagram of a system for providing consumer initiated flexible financing, according to an embodiment of the present invention.

FIG. 1 is a diagram of a system for providing consumer initiated flexible financing, according to an embodiment of the present invention. Customer 110 may interact with Provider 114 in accordance with an embodiment of the present invention. Provider 114 may provide a variety of functionality related to financing and/or other services, as shown by Card Issuing Module 140, Request Receiving Module 142, Authorizing Module 144 and Designating Module 146. Other functionality may be available as well by Other Module 148, for example. The modules associated with Provider 114 may interact with each other and may also function separately or in combination. A card for purchasing products and/or services with pre-approved financing may be provided to a customer via Card Issuing Module 140. In addition, other forms of association with an embodiment of the present invention may be implemented, such as a password, identifier or other mechanism that may be used in place of an actual physical card. For example, customer 110 may request a credit line extension to accommodate one or more future purchases from Provider 114, as shown by 130. The request may be received by Request Receiving Module 142 and may be made at a time prior to the purchase (e.g., 15 minutes, 1 hour before the purchase, 1 day before the purchase, or other time period, etc.). Alternative financing options may be reviewed with the consumer (or other representative, such as accountant, etc.) at a time of card activation and/or at a time prior to a purchase. Provider 114 may review expenses, initiate instant decisioning and/or review current financing options and terms, for example. Such services may be provided at Request Receiving Module 142. Instant decisioning may relate to credit decisioning performed in real time. For example, an automated process may evaluate a customer's credit report (or other information) based on a customer's rating, which may be based on prior credit experience and/or other information. The customer's rating may be a score used to assist lenders (or other providers) in evaluating credit-worthiness. The score may inform a lender (or other provider) how likely a customer is to repay a loan or make payments on time. Other data and information may be considered.

Customer 110 may then purchase a product from Merchant 112, as shown by 132. This purchase may be performed at a merchant store, over the Internet, via phone order or other purchasing mechanism using the card product (or other identifier or purchase mechanism) of an embodiment of the present invention. The purchase may be authorized and completed using the card product of an embodiment of the present invention. For example, Authorizing Module 144 may provide authorization (e.g., provide a credit line or other form of authorization) for the purchase as shown by 134. The credit associated with the requested future purchase may be valid for a predetermined time limit. For example, the customer may be required to make the requested future purchase within a predetermined time period (e.g., hours, days, 2-5 days, etc.) of requesting the credit line extension for a future purchase.

After the purchase, customer 110 may then contact Provider 114, as shown by 136, within a time period after the purchase (e.g., hours, days, 2-5 business days, etc.). Designating Module 146 enables the customer to designate one or more financing products (as shown by 116, 118, 120) to finance the purchased product. For example, the balance on the card product may be transferred to a designated one or more financing products.

The transaction provided by an embodiment of the present invention may be considered a loan/lease secured by the purchase where the purchase may be a revenue producing property. In another example, the loan/lease may be an unsecured, as determined at least in part by the consumer's credit information, such as credit standing and/or credit worthiness. For example, if the purchase is below a predetermined amount and the consumer has good credit standing, the loan/lease may be unsecured. Other criteria may be considered in determining whether the loan/lease is secured or unsecured. For example, if a consumer with good credit history (e.g. good credit standing) is interested in purchasing computer equipment having a price below $3000, an embodiment of the present invention may provide a unsecured loan/lease.

If the customer fails to perfect the transaction by performing necessary (or agreed upon) steps, the loan may transform into a default product. For example, if a customer fails to make one or more payments, sign appropriate papers, perfect the transaction or perform other agreed upon actions, the secured transaction may transform into an unsecured default product. The default product may be a unsecured loan/lease, a credit card debt, a debt at a higher interest rate, an unsecured installment loan, or other default product. The default product may be agreed upon by the provider and customer at a time prior to the purchase. According to another embodiment of the present invention, the default product may be segregated from other purchases. For example, the customer may be required to pay off the default product more aggressively than other purchases made in accordance with an embodiment of the present invention.

As shown in FIG. 1, financing product 116 may represent a loan, such as an installment loan and/or asset-backed loan. Financing product 116 may be offered by or associated with financial institution 122. Financing product 118 may represent a line of credit, which may be offered or associated with financial institution 124. Financing product 120 may represent an equipment lease, which may be offered by or associated with financial institution 126. Each financing product may be represented by the same financial institution 128 or different financial institutions 122, 124, 126 (or other financing entity). Other financing products may be available to the customer as well. If necessary, the customer may sign loan papers (or other documents) or perform other action (or steps) to secure the financing.

Other functions may be provided by an embodiment of the present invention as shown by Other Module 148. According to another embodiment, the present invention may provide detailed, consolidated reports (e.g., weekly, bi-monthly, monthly, quarterly, annually, or other recurring time period); on-line access to account and transaction information associated with the card product; and management reports, for example. In addition, the customer may separate business expenses from personal expenses; establish credit in a business name; view all products via a financial institution's secure web-site and perform other functions. The customer may also perform balance transfers between or among various financial products as well as view and analyze balance information associated with various products. For example, the customer may categorize information by predefined or user-defined groups or products. In addition, the customer may also download information to a financial or other software application.

Figure 2:
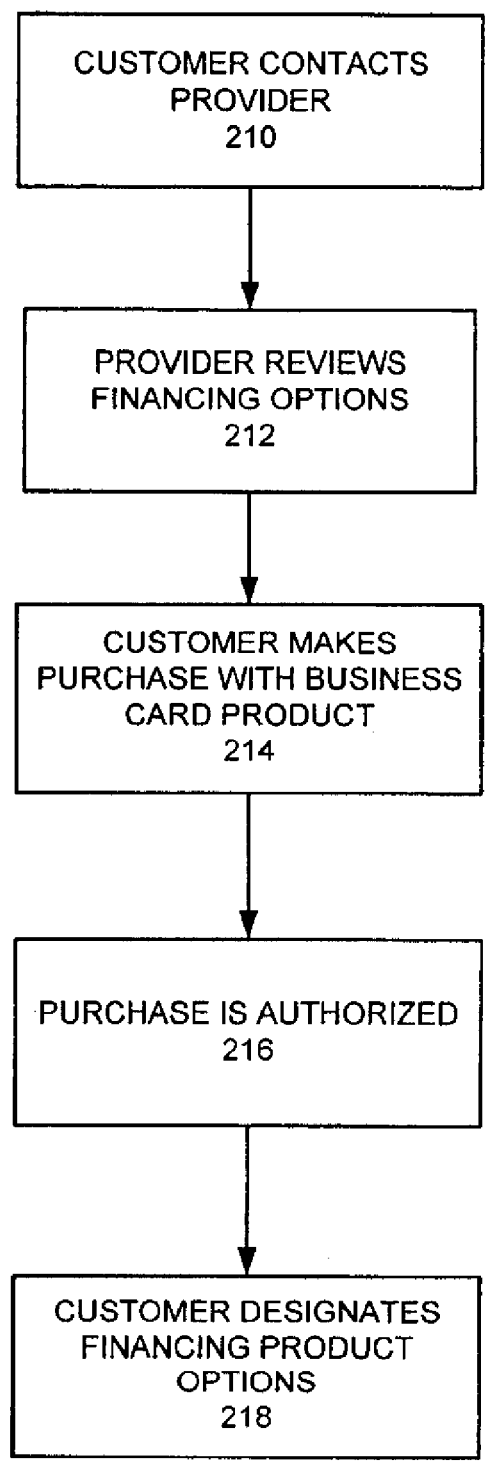
FIG. 2 is a flowchart illustrating a method for providing consumer initiated flexible financing, according to an embodiment of the present invention.

FIG. 2 is a flowchart illustrating a method for providing consumer initiated flexible financing, according to an embodiment of the present invention. At step 210, a customer may contact a provider to activate a credit line extension or other pre-approved credit instrument. The customer may also inform the provider of a future purchase. The future purchase may be identified by category code, merchant identifier, or other identification. At step 212, the provider may review expenses, initiate instant decisioning, and/or review current financing options and terms. At step 214, the customer may make a purchase with a card product of an embodiment of the present invention. At step 216, the purchase may be authorized by the provider. This authorization may be effective for a predetermined period of time (e.g., hours, days, 2-5 business days, etc.). In addition, the time and/or scope associated with the authorization may be variable. For example, the authorization time may be shortened or extended based on various factors, such as a user request for such an extension, type of purchase (e.g., multiple suites of office equipment), consumer credit history and/or other information. The provider may also confirm the purchase of the product for which pre-approval has been granted to ensure the credit was used for the intended purpose. At step 218, the customer may contact the provider and designate one or more financing options (e.g., loan, credit line, lease, etc.). Other actions may be performed to finalize the financing. In addition, the consumer may easily transfer balances between or among various financing products. According to another example, the present invention may automatically determine an optimal financial product or plan based on various factors and business needs of the consumer. For example, the customer may identify certain criteria of interest, such as monthly payments, interest rate or other factors that may be considered in recommending a financial product or plan to the customer.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

The invention claimed is:

1. A computer implemented method for providing customer initiated flexible financing for one or more purchases, wherein the method is executed by a programmed computer processor, the method comprising the steps of:
   issuing a card product to a customer for financing a plurality of products and services, including at least one revenue producing property;
   analyzing one or more financing options available to the customer prior to a purchase of the at least one revenue producing property using the programmed computer processor;
   authorizing a future purchase of the at least one revenue producing property to enable the customer to purchase the at least one revenue producing property with the card product, wherein the card product provides the ability to make a combination of an online purchase, phone order purchase and merchant location purchase;
   receiving a customer contact after the purchase is made for designating one or more of the one or more financing options available to the customer for financing of the at least one revenue producing property, wherein the one or more financing options comprise one or more of installment loan, asset-backed loan, line of credit, product lease and equipment lease;
   transferring a balance attributed to the card product to one or more designated financing options; and
   transforming the purchase into a secured loan secured by the at least one revenue producing property or an unsecured loan.

2. The method of claim 1, wherein the purchase is made with one or more of a password and identifier representative of the card product.

3. The method of claim 1, wherein the customer contact is received within 5 days after the purchase is made.

4. The method of claim 1, wherein the customer contact further comprises executing one or more loan documents.

5. The method of claim 1, further comprising the step of:
   generating an optimal financial plan specific to the customer for financing the future purchase.

6. The method of claim 1, wherein the at least one revenue producing property comprises at least one of computers, copiers, machinery and equipment.

7. The method of claim 1, wherein the at least one revenue producing property comprises property that is capitalized for a business.

8. The method of claim 1, wherein the purchase reverts to a default product if the customer fails to perfect the purchase of the at least one revenue producing property wherein the default product is unsecured.

9. A system for providing customer, initiated flexible financing for one or more purchases, the system comprising:
   a programmed computer processor;
   a card issuing module configured to issue a card product to a customer for financing a plurality of products and services, including at least one revenue producing property;
   a financing module configured to analyze one or more financing options available to the customer prior to a purchase of the at least one revenue producing property;
   an authorizing module configured to authorize a future purchase of the at least one revenue producing property to enable the customer to purchase the at least one revenue producing property with the card product, wherein the card product provides the ability to make a combination of an online purchase, phone order purchase and merchant location purchase; and
   a designating module configured to receive a customer contact after the purchase is made for designating one or more of the one or more financing options available to the customer for financing options comprise one or more of installment loan, asset-backed loan, line of credit, product lease and equipment lease;
   for transferring a balance attributed to the card product to one or more designated financing options; and
   for transforming the purchase into a secured loan secured by the at least one revenue producing property or an unsecured loan.

10. The system of claim 9, wherein the purchase is made with one or more of a password and identifier representative of the card product.

11. The system of claim 9, wherein the customer contact is received within 5 days after the purchase is made.

12. The system of claim 9, wherein the customer contact further comprises executing one or more loan documents.

13. The system of claim 9, wherein an optimal financial plan is generated specific to the customer for financing the future purchase.

14. The system of claim 9, wherein the at least one revenue producing property comprises at least one of computers, copiers, machinery and equipment.

15. The system of claim 9, wherein the at least one revenue producing property comprises property that is capitalized for a business.

16. The system of claim 9, wherein the purchase reverts to a default product if the customer fails to perfect the purchase of the at least one revenue producing property wherein the default product is unsecured.

* * * * *